United States Patent
Jamet et al.

(10) Patent No.: US 10,563,954 B2
(45) Date of Patent: Feb. 18, 2020

(54) AIMING SYSTEM COMPRISING A SCREEN COVERED WITH A TACTILE INTERFACE AND CORRESPONDING AIMING METHOD

(71) Applicant: SAFRAN ELECTRONICS & DEFENSE, Boulogne Billancourt (FR)

(72) Inventors: Alexandre Jamet, Boulogne Billancourt (FR); Cyril Morin, Boulogne Billancourt (FR); Jordane Grenier, Boulogne Billancourt (FR); Olivier Hurault, Boulogne Billancourt (FR); Stephane Hommais, Boulogne Billancourt (FR); Thomas Dazeniere, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/578,667

(22) PCT Filed: May 31, 2016

(86) PCT No.: PCT/EP2016/062308
§ 371 (c)(1),
(2) Date: Nov. 30, 2017

(87) PCT Pub. No.: WO2016/193271
PCT Pub. Date: Dec. 8, 2016

(65) Prior Publication Data
US 2018/0164075 A1  Jun. 14, 2018

(30) Foreign Application Priority Data
Jun. 1, 2015 (FR) .................................. 15 54967

(51) Int. Cl.
*G06F 3/048* (2013.01)
*F41G 3/16* (2006.01)
(Continued)

(52) U.S. Cl.
CPC ............... *F41G 3/165* (2013.01); *F41G 1/40* (2013.01); *G06F 3/0482* (2013.01);
(Continued)

(58) Field of Classification Search
None
See application file for complete search history.

(56) References Cited

U.S. PATENT DOCUMENTS 7,932,893 B1 * 4/2011 Berthaud ............... G04G 21/00
178/18.06
9,366,504 B2 * 6/2016 Hester ................... F41G 3/2694
(Continued)

FOREIGN PATENT DOCUMENTS

| EP | 1 012 820 A1 | 6/2000 |
| EP | 2 711 059 A2 | 3/2014 |
| WO | WO 01/29815 A1 | 4/2001 |

*Primary Examiner* — Hua Lu
(74) *Attorney, Agent, or Firm* — Muncy, Geissler, Olds & Lowe, P.C.

(57) ABSTRACT

The invention provides an aiming system comprising a display control unit connected to a screen having a surface that is covered at least in part by a touch interface, the display control unit being arranged to inlay an aiming frame in the images displayed on the screen. According to the invention, the display control unit is arranged to: inlay a control zone in a portion of the touch interface; and to move the aiming frame on the screen as a function of a contact exerted on the touch interface in the control zone. The invention also provides an aiming method implemented with such a system.

13 Claims, 1 Drawing Sheet

(51) Int. Cl.
*G06F 3/0488* (2013.01)
*G06F 3/0482* (2013.01)
*F41G 1/40* (2006.01)
*F41G 3/22* (2006.01)
*F41G 7/00* (2006.01)

(52) U.S. Cl.
CPC ........ *G06F 3/0488* (2013.01); *G06F 3/04883* (2013.01); *F41G 3/22* (2013.01); *F41G 7/007* (2013.01); *G06F 2203/04808* (2013.01)

(56) References Cited

U.S. PATENT DOCUMENTS

| | | | | |
|---|---|---|---|---|
| 2002/0027190 A1* | 3/2002 | Hellak | ...................... | F41J 5/02 250/222.1 |
| 2009/0207141 A1* | 8/2009 | Dubs | .................... | G06F 3/0488 345/173 |
| 2009/0273208 A1* | 11/2009 | Ballard | .................... | B60R 1/04 296/201 |
| 2012/0090216 A1* | 4/2012 | Li | ............................ | F41G 1/38 42/122 |
| 2012/0126002 A1* | 5/2012 | Rudich | ................. | F41G 11/001 235/404 |
| 2013/0055119 A1* | 2/2013 | Luong | ................. | G06F 3/04883 715/764 |
| 2013/0228975 A1* | 9/2013 | Mason, III | ................. | F41J 1/10 273/406 |
| 2014/0168447 A1* | 6/2014 | Scott | ................... | H04N 5/23293 348/169 |
| 2015/0108215 A1* | 4/2015 | Ehrlich | ................... | G01S 17/88 235/404 |
| 2015/0123346 A1* | 5/2015 | Mason | ....................... | F41J 1/10 273/371 |
| 2015/0233674 A1* | 8/2015 | Beckman | ................. | F41G 1/46 235/407 |
| 2015/0241172 A1* | 8/2015 | Roman | ................... | F41G 1/473 235/404 |
| 2017/0176144 A1* | 6/2017 | Zhang | ..................... | F41G 3/165 |
| 2017/0254621 A1* | 9/2017 | Sammut | ..................... | F41G 1/38 |
| 2017/0307333 A1* | 10/2017 | Northrup | ................ | F41A 33/00 |
| 2018/0031353 A1* | 2/2018 | Skrepetos | .................. | F41J 5/10 |

* cited by examiner

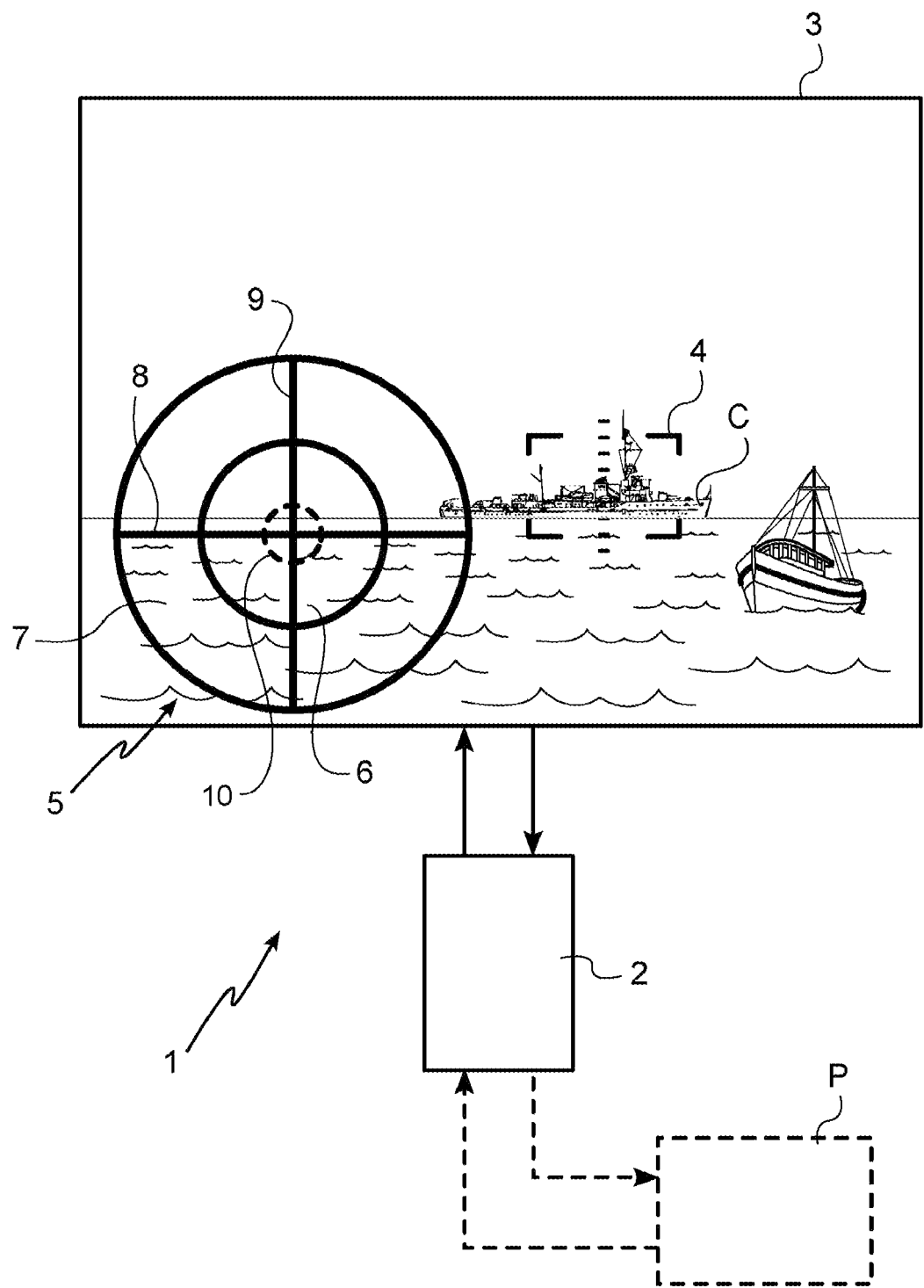

AIMING SYSTEM COMPRISING A SCREEN COVERED WITH A TACTILE INTERFACE AND CORRESPONDING AIMING METHOD

The invention relates to the field of aiming and pointing a device at a target displayed on a screen. More particularly, the invention provides an aiming system comprising a screen having a surface that is covered at least in part in a touch interface. The invention also relates to an aiming method performed with such an aiming system.

TECHNOLOGICAL BACKGROUND OF THE INVENTION

In the naval field, it is known for ships to be fitted with an aiming system for pointing a weapon at a target. Typically, an aiming system comprises a display control unit that is connected to a screen in order to display images from a camera on board the ship, and that is arranged to inlay an aiming frame in said images. In service, the operator moves the aiming frame by means of a control of the joystick type.

In order to improve ergonomics and limit the number of different interfaces, proposals have been made to cover the surface of the screen in a touch interface. The control unit is arranged to detect a zone of the screen against which the operator presses a finger in order to center the aiming frame on that zone. The operator can thus move the aiming frame in order to put a frame around or point at a target visible in the images in order to lock onto said target.

Nevertheless, since the target may be of small dimensions, the target can be masked by the operator's finger. It has therefore been found difficult for the operator to point correctly at a target, in particular when a plurality of potential targets are to be found in the same zone of the screen, or when the target is moving on the screen.

OBJECT OF THE INVENTION

An object of the invention is to propose an aiming system that enables an operator to point more easily at a target visible on a screen of said aiming system. An object of the invention is also to propose a corresponding aiming method.

BRIEF SUMMARY OF THE INVENTION

In order to achieve this object, there is provided an aiming system comprising a display control unit and a screen connected to the display control unit in order to display images from a camera, the screen having a surface that is covered at least in part by a touch interface connected to the display control unit, and the display control unit being arranged to inlay an aiming frame in the images displayed on the screen.

According to the invention, the display control unit is arranged to:
 inlay a control zone in the images displayed on the screen and where the screen has the touch interface; and
 move the arcing frame on the screen as a function of contacts exerted on the touch interface in the control zone.

By having the control zone distinct from the aiming frame, it is found easier for an operator to view the aiming frame in spite of the aiming frame moving on the screen. In particular, since the operator does not move the aiming frame directly with the fingers, said aiming frame and the target remain more visible and it is therefore simpler for the operator to follow a moving target in the images or to point at one target situated among other potential targets.

The invention also provides an aiming method performed using an aiming system having a screen for displaying images from a camera, the screen having a surface that is covered at least in part by a touch interface, the method including the step of inlaying an aiming frame in the images displayed on the screen, and the method being characterized in that it further comprises the steps of inlaying a control zone in the images displayed on the screen and where the screen has the touch interface; and moving the aiming frame on the screen as a function of contact exerted on the touch interface in the control zone.

BRIEF DESCRIPTION OF THE DRAWING

The invention can be better understood in the light of the following description of a particular, non-limiting embodiment of the invention. Reference is made to the sole FIGURE, which is a diagram showing the aiming system of the invention.

DETAILED DESCRIPTION OF THE INVENTION

With reference to the sole FIGURE, the aiming system of the invention, given overall reference 1, is carried in this example by a navel vessel.

The aiming system 1 comprises a display control unit 2 with a screen 3 connected to the display control unit 2 in order to display images from a camera P that is also carried by the vessel for the purpose of acquiring images from outside the vessel, and that is likewise connected to the display control unit 2. In this example, the screen 3 has a surface that is completely covered in a touch interface connected to the display control unit 2. The touch interface is itself known and, by way of example, may comprise a mesh of pressure sensors or indeed a mesh of resistive, capacitive, inductive, or other sensors.

The display control unit 2 is arranged to inlay an aiming frame 4 in the images displayed on the screen 3. In the invention, the display control unit 2 is also configured to inlay a control zone 5 in the images displayed on the screen 3 and to allow the aiming frame 4 to be moved on the screen 3 as a function of contact exerted on the touch interface in the control zone 5 by an operator.

In this example, the display control unit 2 is also arranged to trigger locking onto a target C visible on the screen 3 when the aiming frame 4 designates said target C and two distinct contacts are inserted simultaneously on the control zone 5, as described below.

In particular manner, the display control unit 2 is arranged to inlay the aiming frame 4 on the screen 3 only while contact is being exerted on the control zone 5. This makes it possible to limit the number of inlays on the screen 3, thereby making it easier to read the images displayed by the screen 3. As soon as contact ceases to be exerted in the control zone 5, the aiming frame 4 disappears from the screen.

In this example, the display control unit 2 is also arranged to inlay the control zone 5 on images only while contact is being exerted on the touch interface. This makes it possible to further limit the number of inlays on the screen. The display control unit 2 is preferably configured to inlay the control zone 5 at said point of contact exerted by the operator on the touch interface.

From one use to another (i.e. after each interruption of contact exerted on the touch interface), the control zone 5 can thus change position on the screen 3. Nevertheless, during a single use (i.e. so long as contact is maintained in continuous manner), the control zone 5 remains stationary on the screen 3.

In particular manner, the display control unit 2 and the touch interface are arranged so that the control zone 5 includes a first portion 6 and a second portion 7 such that while contact is being exerted on the first portion 6, the aiming frame 4 is moved on the screen 3 in a first speed range, and while contact is being exerted in the second portion 7, the aiming frame 4 is moved on the screen 3 in a second speed range. Typically, the first portion 6 forms a circular portion of the control zone 5 and the second portion 7 forms a peripheral circular portion of the control zone 5 concentric with the first portion 6.

This enables the operator to vary the speed with which the aiming frame 4 is to be moved depending on whether the target C for pointing at is closer to or further from the aiming frame 4, and this applies without the operator needing to adapt the travel speed of a finger. This makes it simpler to aim at the target C.

Preferably, the first speed range is faster than the second speed range so that the operator can move the aiming frame 4 quickly with a finger pressed in the first portion 6 near the center of the control zone 5, and can then move the aiming frame 4 more slowly with a finger pressed in the second portion 7, at the periphery of the control zone 5. This arrangement is particularly ergonomic for the operator.

Consequently, the display control unit 2 is preferably arranged in such a manner that the first portion 6 of the control zone 5 is represented on the screen 3 by a first circle, and the second portion 7 of the control zone 5 is represented on the screen 3 by a second circle concentric with said first circle. The two portions 6 and 7 are thus defined on the screen, thereby making it easier for the operator to move the aiming frame 4 by means of the control zone 5.

In a particular embodiment, the display control unit 2 also represents the control zone 5 by subdividing said zone with a horizontal line 8 and a vertical line 9. Unlike the two portions 6 and 7 of the control zone 5, these lines do not define portions having different properties within the control zone 5, but they serve as markers to enable the operator to move a finger and thereby move the aiming frame 4.

As a result, in this example, the control zone 5 has eight control portions in the form of annular segments: four portions defined by the first circle, the horizontal line 8, and the vertical line 9, and four other portions defined by the first circle, the second circle, the horizontal line 8, and the vertical line 9. The control zone 5 then looks like a target.

The aiming method implemented by the above aiming system 1 is described below.

The operator begins by pressing on the touch interface. The display control unit 2 then inlays the aiming frame 4 on the screen 3, e.g. in the center of the screen 3, and also inlays the control zone 5 at the point where the operator exerts contact on the touch interface. The inlay is performed in such a manner that a central portion 10 is centered on the intersection of the lines 8 and 9, which is positioned at the first point of contact. In this example, the central portion 10 is not represented on the screen 3 by the display control unit 2. The control zone 5 is stationary and continues to be displayed so long as the operator's finger remains in contact with the screen.

Thereafter, without losing the contact exerted on the control zone 5 with a finger, so as to avoid the aiming frame 4 and the control zone 5 disappearing, the operator moves the finger in the control zone 5 away from the central portion 10 in order to cause the display control unit 2 to move the aiming frame 4 on the screen 3 in similar manner. If the operator takes the finger off the screen 3, the aiming frame 4 and the control zone 5 disappear.

In this example, the display control unit 2 is arranged so that so long as contact is exerted in the control zone 5 away from the central portion 10, the aiming frame 4 moves on the screen 3 in the direction defined by the position of the contact in the control zone 5, and this continues even if said contact does not move in the control zone 5. In this example, the display control unit 2 is also arranged in such a manner that when the contact exerted returns with a substantially radial movement to the central portion 10, the movement of the aiming frame 4 is stopped. The aiming frame 4 is then stationary and only a movement of the point of contact away from the central portion 10 will cause the aiming frame 4 to move once more in corresponding manner on the screen 3.

Once the aiming frame 4 brackets or designates a desired target C, the operator moves the finger with a substantially radial movement into the central portion 10 of the control zone 5 in order to hold the aiming frame 4 stationary. Thereafter the operator exerts a second contact on the control zone 5 with a second finger while not releasing the contact exerted on the central portion of the control zone 5 with the first finger that has been used for moving the aiming frame 4. This enables the aiming system 1 to lock onto the target C.

Naturally, the invention is not limited to the embodiments described and embodiment variants may be applied thereto without going beyond the ambit of the invention as defined by the claims.

In particular, although the presently-described aiming system is carried by a navel vessel, the aiming system could be carried by any other vehicle, e.g. a land vehicle.

Although the described touch interface covers the entire screen, the touch interface could cover only a portion of the screen. The display control unit could inlay the control zone at the point of contact exerted by the operator or at any other location on the screen. For example, the control unit could inlay the control zone always in a given portion of the screen, independently of the location of the point of contact exerted by the operator, e.g. in a bottom corner of the screen.

The aiming frame and/or the control zone may always be visible on the screen even though there is no contact with the touch interface.

Naturally, the control zone could have an appearance other than that of a target, for example it could merely be a circle. The control zone could be subdivided into some number of portions that is different from the above description.

The central portion could also be represented on the screen by the display control unit. Although in this example the central portion forms a zone centered on the first point of contact on the touch interface, the central portion could have some other form, and might for example be no more than a simple dot coinciding with the first point of contact. The aiming system need not include a central portion, in which case the display control unit may be arranged to move the aiming frame on the screen only during movement of the contact exerted in the control zone. As a result, when the contact ceases to move in the control zone while still remaining present, the aiming frame remains stationary.

The invention claimed is:

1. An aiming system comprising a display control unit and a screen connected to the display control unit in order to display images from a camera, the screen having a surface that is covered at least in part by a touch interface connected to the display control unit, and the display control unit being arranged to inlay an aiming frame in the images displayed on the screen, wherein the display control unit is arranged to:
 inlay a control zone in the images displayed on the screen and where the screen has the touch interface, the control zone being distinct from the aiming frame;
 move the aiming frame on the screen as a function of contacts exerted on the touch interface in the control zone;
 wherein the aiming frame as well as the control zone do not cover all the screen; and
 wherein the display control unit is arranged to trigger locking onto a target visible on the screen when the aiming frame designates said target and when a locking command is transmitted to the control unit.

2. The system according to claim 1, wherein the display control unit is arranged to represent the control zone on the screen as a geometrical figure that is subdivided into portions by a horizontal line and by a vertical line.

3. The system according to claim 1, wherein the control zone is configured so as to include a first portion and a second portion, the display control unit being arranged to move the aiming frame on the screen in a first speed range as a function of contact being exerted in the first portion, and to move the aiming frame on the screen in a second speed range as a function of contact being exerted in the second portion.

4. The system according to claim 3, wherein the display control unit is arranged in such a manner that the first portion forms on the screen a circular portion and in such a manner that the second portion forms on the screen a peripheral circular portion concentric with the first.

5. The system according to claim 1, wherein the display control unit is arranged to inlay the aiming frame and/or the control zone on the screen only while contact is being exerted on the touch interface.

6. The system according to claim 1, wherein the display control unit is arranged to move the aiming frame on the screen as a function of movements of fingers exerted on the touch interface in the control zone by an operator.

7. The system according to claim 1, wherein the control zone and the aiming frame are independently movable.

8. The system according to claim 1, wherein the display control unit is arranged to move the aiming frame at a speed on the screen as a function of contacts exerted on the touch interface in the control zone.

9. The system according to claim 1, wherein the control zone remaining stationary on the screen so long as contact is maintained on the touch interface by a finger of an operator.

10. The system according to claim 1, wherein the display control unit is arranged to move the aiming frame that the aiming frame moves in a manner similar to the movement of a finger of an operator in the control zone.

11. An aiming method performed using an aiming system having a screen for displaying images from a camera, the screen having a surface that is covered at least in part by a touch interface, the method including the step of inlaying an aiming frame in the images displayed on the screen, and the method comprising the steps of:
 inlaying a control zone in the images displayed on the screen and where the screen has the touch interface, the control zone being distinct from the aiming frame; and
 moving the aiming frame on the screen as a function of contact exerted on the touch interface in the control zone;
 wherein the aiming frame as well as the control zone do not cover all the screen; and
 wherein the display control unit is arranged to trigger locking onto a target visible on the screen when the aiming frame designates said target and when a locking command is transmitted to the control unit.

12. An aiming system comprising a display control unit and a screen connected to the display control unit in order to display images from a camera, the screen having a surface that is covered at least in part by a touch interface connected to the display control unit, and the display control unit being arranged to inlay an aiming frame in the images displayed on the screen, wherein the display control unit is arranged to:
 inlay a control zone in the images displayed on the screen and where the screen has the touch interface, the control zone being distinct from the aiming frame; and
 move the aiming frame on the screen as a function of contacts exerted on the touch interface in the control zone;
 wherein the aiming frame as well as the control zone do not recover all the screen,
 wherein the display control unit is arranged to trigger locking onto a target visible on the screen when the aiming frame designates said target and when a locking command is transmitted to the control unit,
 wherein the locking command comprises two distinct contacts being exerted simultaneously on the control zone.

13. An aiming method performed using an aiming system having a screen for displaying images from a camera, the screen having a surface that is covered at least in part by a touch interface, the method including the step of inlaying an aiming frame in the images displayed on the screen, and the method comprising the steps of:
 inlaying a control zone in the images displayed on the screen and where the screen has the touch interface, the control zone being distinct from the aiming frame; and
 moving the aiming frame on the screen as a function of contact exerted on the touch interface in the control zone;
 wherein the aiming frame as well as the control zone do not recover all the screen,
 wherein the display control unit is arranged to trigger locking onto a target visible on the screen when the aiming frame designates said target and when a locking command is transmitted to the control unit,
 wherein the locking command comprises two distinct contacts being exerted simultaneously on the control zone.

* * * * *